US 9,233,568 B1

(12) United States Patent
Mizes et al.

(10) Patent No.: US 9,233,568 B1
(45) Date of Patent: Jan. 12, 2016

(54) CROSS-PROCESS DIRECTION UNIFORMITY FOR WIDE FORMAT PRINTERS (71) Applicant: XEROX CORPORATION, Norwalk, CT (US)

(72) Inventors: Howard A. Mizes, Pittsford, NY (US); Mojgan Rabbani, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/314,527

(22) Filed: Jun. 25, 2014

(51) Int. Cl.
*G03G 15/00* (2006.01)
*B41J 29/393* (2006.01)

(52) U.S. Cl.
CPC ................................. *B41J 29/393* (2013.01)

(58) Field of Classification Search
USPC .......................................................... 399/49
See application file for complete search history.

(56) References Cited

U.S. PATENT DOCUMENTS

| 6,471,916 | B1 | 10/2002 | Noblett |
| 7,095,531 | B2 | 8/2006 | Mizes et al. |
| 7,547,903 | B2 | 6/2009 | Mizes et al. |
| 7,812,999 | B2 | 10/2010 | Motamed |
| 8,040,530 | B2 | 10/2011 | Cooper |
| 8,355,118 | B2 | 1/2013 | Ogawa et al. |
| 2007/0076039 | A1* | 4/2007 | Batalla et al. ................... 347/19 |
| 2008/0019611 | A1* | 1/2008 | Larkin et al. .................. 382/287 |
| 2010/0053699 | A1* | 3/2010 | Cahill et al. .................. 358/474 |
| 2013/0249907 | A1 | 9/2013 | Humphries et al. |

FOREIGN PATENT DOCUMENTS

JP 2009037422 A * 2/2009

* cited by examiner

*Primary Examiner* — Quana M Grainger
(74) *Attorney, Agent, or Firm* — Gibb & Riley, LLC (57) ABSTRACT

Methods and systems print test patterns in different test pattern areas on print media using a printer to produce a printed item. The printer has a printing width in a cross-process direction, and each of the test pattern areas is in a different cross-process location of the printing width. The test pattern areas are distributed across the entire printing width, and each of the test pattern areas partially overlaps at least one other test pattern area in the cross-process direction. Next, these methods and systems individually scan the sections of the printed item using a scanner that has a scanning width that is less than the printing width. This produces individual scans of the test pattern areas. The widths of the test pattern areas are equal to or less than the scanning width. Then, these methods and systems can calibrate cross-process characteristics of the printer based on the scans.

20 Claims, 10 Drawing Sheets

CROSS-PROCESS DIRECTION UNIFORMITY FOR WIDE FORMAT PRINTERS

BACKGROUND

Systems and methods herein generally relate to calibrating printers, and more particularly to calibrating wide format printers using a scanner.

In order to produce streak free prints, the actual print density that the printer produces for a given digital gray level must be independent of the cross-process position. Often this is not the case. One approach to deal with this is to calibrate the printer by measuring the non-uniformity of a series of strips at different digital gray levels. With this information an actuator, such as the digital gray level at each spatial location can be modified to compensate for the non-uniformity so that the ultimate print will be uniform.

SUMMARY

Methods herein print test patterns in different test pattern areas on print media using a printer to produce a printed item. The printing moves the print media in a process direction. The printer has a printing width in a cross-process direction perpendicular to the process direction, and each of the test pattern areas is centered in a different cross-process location of the printing width. The test pattern areas are distributed across all the printing width, and each of the test pattern areas partially overlaps at least one other test pattern area in the cross-process direction. However, overlapping test pattern areas are in different process direction locations on the print media to avoid being overprinted on one another.

Such methods divide the printed item into different sections, where each of the sections contains at least one of the test pattern areas. Next, these methods individually scan the sections of the printed item using a scanner that has a scanning width that is less than the printing width. This produces individual scans of the test pattern areas. The widths of the test pattern areas are equal to or less than the scanning width.

Then, these methods calculate individual response curves for the individual scans and combine the individual response curves into a combined response curve, using a processor. The methods also use the processor to calculate the differences between the overlapping portions of the individual response curves within the combined response curve to identify the amount of non-uniformity of the scanner. This allows these methods to adjust the individual response curves within the combined response curve based on the amount of non-uniformity within the scanner to produce an adjusted combined response curve. Thus, these methods can calibrate the cross-process characteristics of the printer based on the adjusted combined response curve, using the processor.

The test patterns comprise alignment marks for correlating overlapping sections of overlapping test pattern areas, and each of the test patterns comprises a different identifier to allow the scans to be processed in the correct order and location. Thus, the calibration process weights overlapping sections of adjacent test pattern areas to compensate for non-uniform illumination of the scanner.

Systems herein include a printer printing test patterns in different test pattern areas on print media to produce a printed item. The printer moves the print media in a process direction when printing. The printer has a printing width in a cross-process direction perpendicular to the process direction, and each of the test pattern areas is centered in a different cross-process location of the printing width. The test pattern areas are distributed across the entire printing width, and each of the test pattern areas partially overlaps another test pattern area in the cross-process direction. Also, a scanner individually scans different sections of the printed item after the printed item is divided into the sections to produce individual scans of the test pattern areas, and each of the sections contains at least one of the test pattern areas. The scanner has a scanning width that is less than the printing width, and the widths of the test pattern areas are equal to or less than the scanning width.

A processor is operatively (meaning directly or indirectly) connected to the printer and the scanner, and the processor calculates individual response curves for the individual scans, combines the individual response curves into a combined response curve, and calculates the differences between the overlapping portions of the individual response curves within the combined response curve to identify the amount of non-uniformity within the scanner. This allows the processor to adjust the individual response curves within the combined response curve based on the amount of non-uniformity within the scanner to produce an adjusted combined response curve. Thus, the processor can calibrate the cross-process characteristics of the printer using the adjusted combined response curve.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, for wide format printers, often a cost-effective sensor is not available to measure the uniformity across the process direction. More specifically, the relationship between the gray level requested from a digital image and the gray level that a printer produces can be characterized by an engine response curve (ERC). The x-axis of the ERC is the digital gray level typically between 0 and 255, while the y-axis is some measurement of the printer response such as optical density, the luminosity channel L* in CIELAB color space, or the gray level output a scanner produces when the print is scanned. For color printers, each color separation is characterized separately.

With knowledge of the ERC, one can define a tone response curve (TRC). The TRC maps the input gray level to a modified input gray level, which is subsequently sent to the printer. The TRC can be used to compensate for undesirable behavior in the ERC. For example, if the printer prints too dark, dark gray levels can be mapped to slightly lighter gray levels.

For many printers, the ERC may vary as a function of position across the process direction. For example, the center of the printer may print slightly darker than the left or right edges in the cross-process direction. Under these circumstances, a spatial engine response curve (sERC) and a spatial tone response curve (sTRC) can be defined. Instead of a single TRC used to compensate for the printer's gray level response, a set of sTRC's can be used locally to compensate each gray level.

Figure 1:
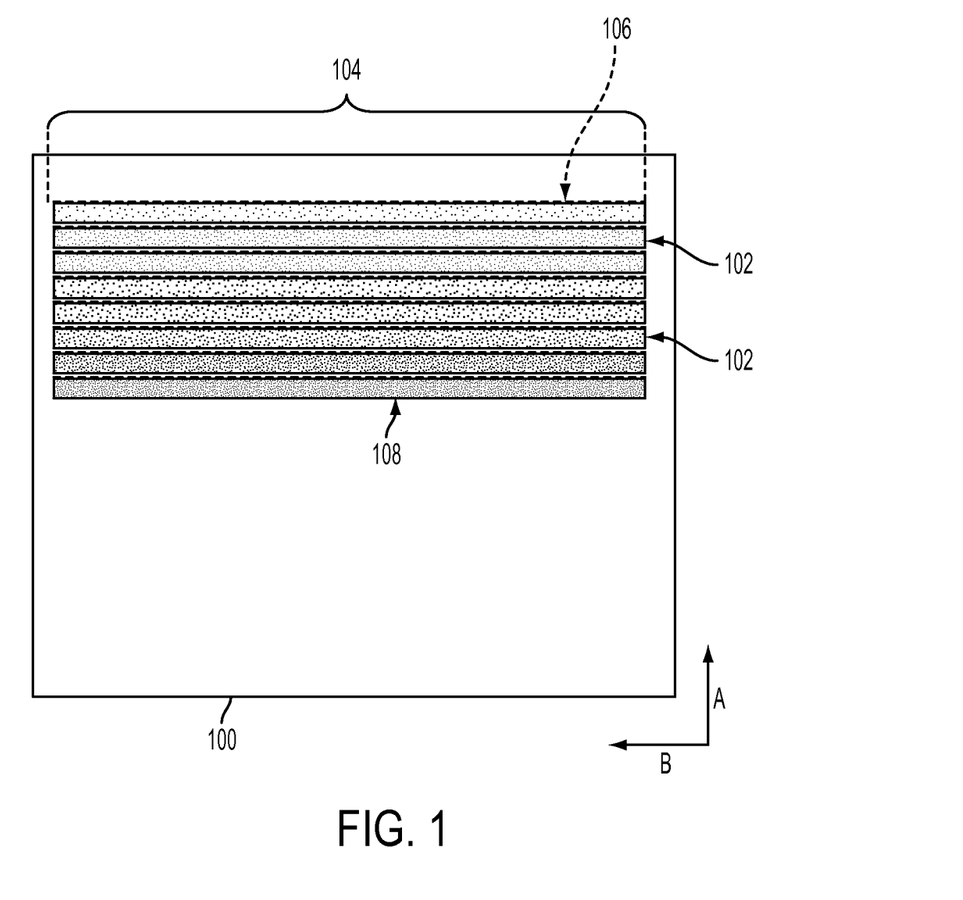
FIG. 1 is a schematic diagram illustrating calibration pattern printing.

The sERC can be, for example, measured using a test pattern 108 as shown printed on print media 100 in FIG. 1. More specifically, the test pattern 108 comprises a series of strips 102 that print at different gray levels and extend in the cross-process direction across the full width 104 of the printer. Adjacent to each strip is a repeating set of cross-process distance markings 106 (which are sometimes referred to as "fiducials") that are used to map the profile in the space of the scanned image to a profile in the space of the digital image. In the lower right corner of FIG. 1, the arrow labeled "A" represents the process direction and the arrow labeled "B" represents the cross-process direction.

In FIG. 1, item 104 represents the maximum printing width of the printer used to print the test sheet 100. If a scanner having a cross-process width at least as large as item 104, the test pattern 108 shown in FIG. 1 can be captured using, for example, an inline full width array linear sensor. Alternatively, the test pattern 108 can be printed and subsequently scanned with a flatbed scanner. However, if a sufficiently wide scanner is not available, the methods and systems herein perform the printing shown in FIG. 3 (discussed below) in order to properly calibrate the printer.

Figure 2:
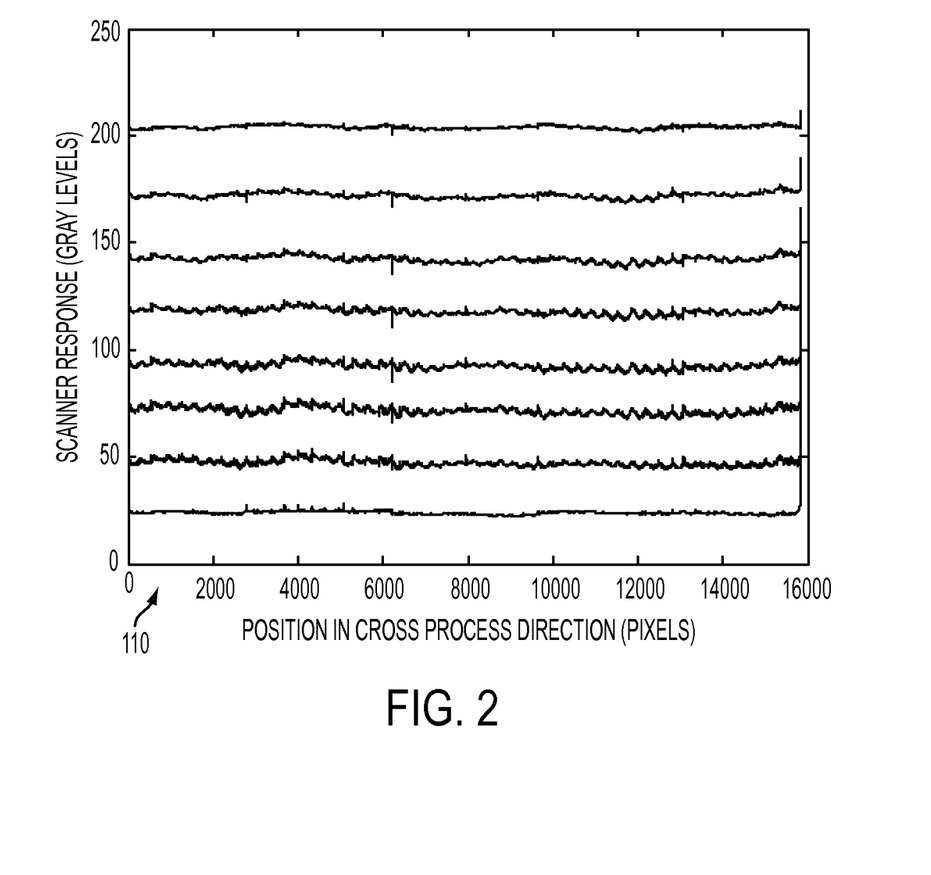
FIG. 2 is a schematic diagram illustrating calibration data.

FIG. 2 is a schematic diagram illustrating calibration data that shows a series of 8 profiles that correspond to the scanner response of each of the 8 strips 102 (shown in FIG. 1) as a function of position in the cross-process direction. Any vertical profile through the 8 strips samples the sERC. From all the sampled sERCs, compensating sTRCs can be calculated.

Many techniques can be used to measure the sERCs and calculate sTRCs. For example, some printers use an inline sensor to monitor the print uniformity, a sensor that is longer than the print process width. Other printers use a flatbed scanner to learn the sERC. Low cost flatbed scanners are readily available to accommodate smaller print width.

Wider format printers can use multiple printheads (inkjet printheads, electrostatic print stations or electrostatic width regions, etc.) that have an inherent banding in the cross-process direction. With such printers, the printheads are stitched together. This stitching can be a source of the banding, which can be objectionable. For pictorial images with large amounts of structure, the streaks due to variations in the sERC are not noticeable, but for images with large uniform areas, objectionable streaks appear in the prints. These streaks limit the range of types of images that customers of the wide format printers will accept. Sensors as wide as wide format printers are not readily available or are quite expensive compared to the cost of the printer.

A flatbed scanner monitors the gray level of a print by illuminating the surface of the print and measuring the diffusely reflected light with a linear array sensor. The response of the system depends not only on the amount of light reflected from the print, but also from the variation in the response of each pixel of the linear array sensor and the uniformity of the illumination. The sensor pixel response variation can be calibrated out by measuring the dark response and the light response (using a uniform white calibration strip), but it is difficult to calibrate the uniformity of the illumination. However, in practice with the light sources used with flatbed scanners, the illumination uniformity varies slowly from one side of the flatbed scanner to the other. Sources of the non-uniformity are primarily due to internal reflections from inside the scanner and light leakage from the outside of the scanner.

If a flatbed scanner that is equal to or greater than the print width is used, then the uniformity test pattern of FIG. 1 can be measured with a single scan. Errors in the illumination uniformity will be manifested as variations in the sERC that are not present. These false variations will result in an incorrect sTRC. However, these errors vary slowly in the cross-process direction and in practice result in an error of less than 3 L* from one side of the print to the other side of the print. This small change in one side of the print to the other side of the print cannot be perceived in the final image and prints made with these corrections appear uniform.

Figure 3:
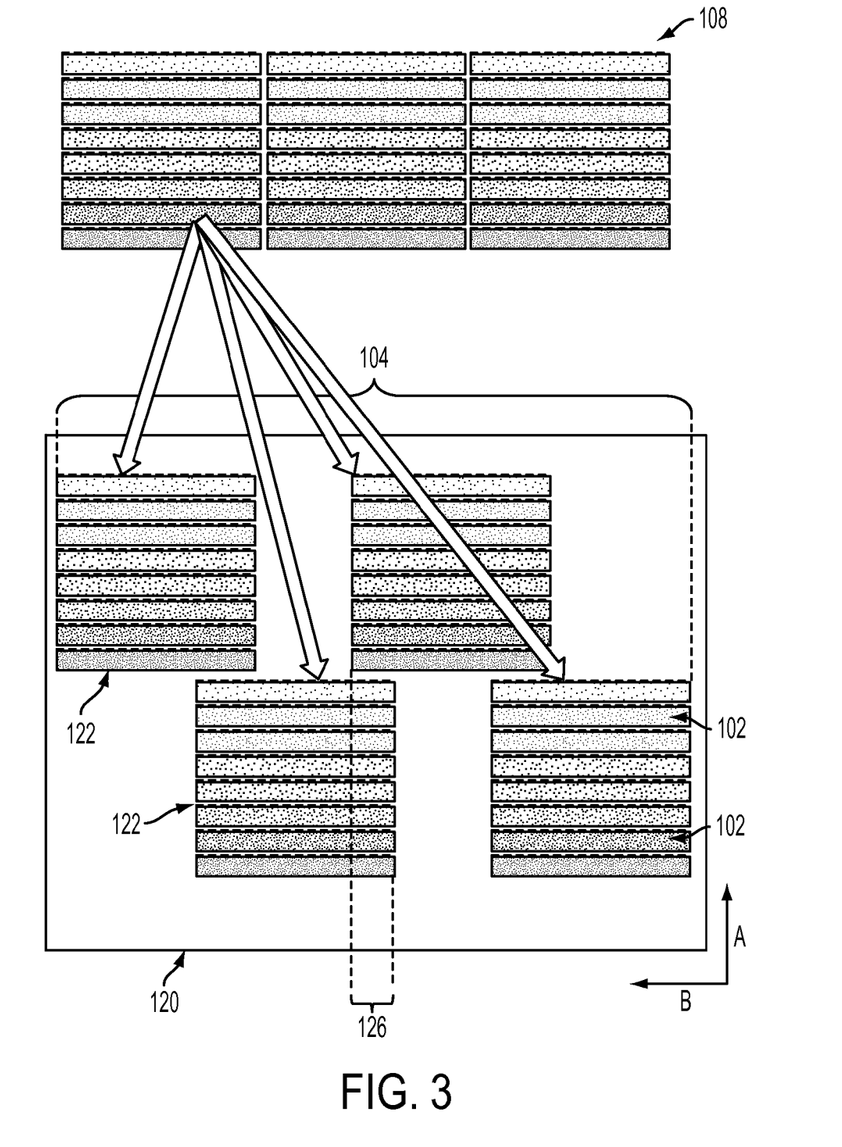
FIG. 3 is a schematic diagram illustrating calibration pattern printing performed by methods and systems herein.

With knowledge of the foregoing, if a sufficiently wide scanner is not available, the methods and systems herein uniformity monitor a test pattern 108 split into two or more test pattern sections 122, each covering a section of the wide format print, as shown in FIG. 3. Each test pattern section 122 is narrow enough to be measured on commonly available flatbed scanners. As noted, flatbed scanners typically have illumination non-uniformities that introduce errors into the uniformity measurement. While these errors do not cause objectionable image quality defects if the test pattern extends the full length of the print, they can cause objectionable image quality defects if two or more sections are stitched together to determine the uniformity across the entire process. Therefore, the methods and systems herein stitch these sections together in a way that mitigates this image quality defect.

More specifically, if a sufficiently wide scanner is not available, the methods and systems herein print multiple test patterns sections 122 that cover some partial portion of the cross-process direction that is smaller than the full width 104 of the printer. The extent of each partial test pattern 122 for a single color separation shown in FIG. 3 is chosen so that it will fit on a low cost flatbed scanner that is readily available.

In the example shown in FIG. 3, the full width (104) test pattern 108 that is printed for scanning on an expensive wide format scanner shown in FIG. 1 is divided into at least two different sections. In FIG. 3, the process can be conceptually thought of as dividing the test pattern 108 (for example, into thirds) and using one or more of the divisions of the full width test pattern 108 to create the individual test patterns 122 (as shown by the block arrows in FIG. 3) and these test patterns 122 are printed on a print media item (sheet) 120. However, it can be more accurate to state that each test pattern i covers an interval [ai,bi] in the cross process position. Any point x in the cross process direction should satisfy $ai<=x<=bi$ for 1 or more of the test patterns i so that the coverage is complete. Also, there should be overlap between the test patterns. Mathematically this is expressed as for any i, there is a j satisfying the set of equations $aj<=bi-s$ and $bj>bi$, where s is the required overlap.

As with FIG. 1 above, in the lower right corner of FIG. 3, the arrow labeled "A" represents the process direction and the arrow labeled "B" represents the cross-process direction. As shown in FIG. 3, some of the test patterns 122 can be printed parallel to one another (aligned with one another) in the cross-process direction; however, the methods and systems herein intentionally overlap each of the test patterns 122 with at least one of the other test patterns 122 in the cross-process direction.

For example, item 126 shows the amount of overlap between two of the partial test patterns 122. Therefore, the methods and systems herein position at least two of the different test patterns at different process direction locations to prevent overprinting (meaning printing two items in the same location) of the cross-process direction overlapping partial test patterns 122.

Figure 4:
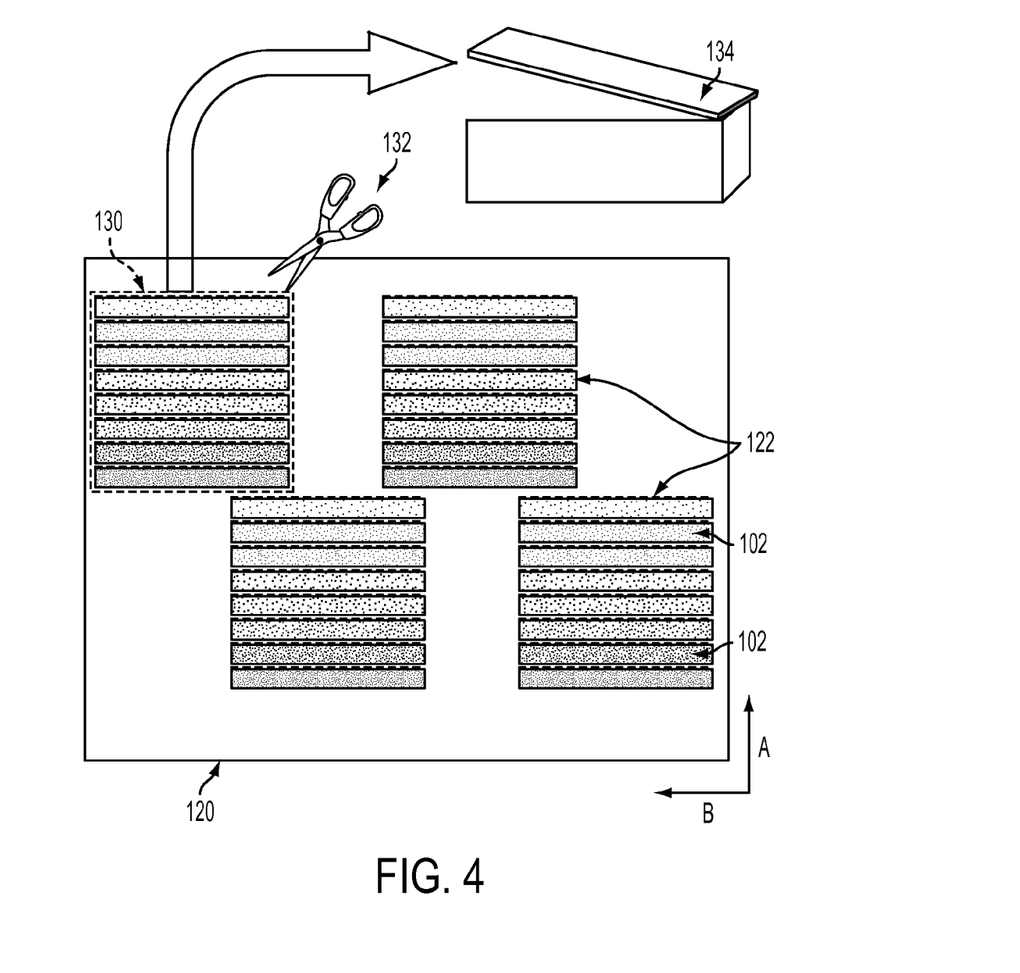
FIG. 4 is a schematic diagram illustrating of processing performed by methods and systems herein.

With methods and systems herein, each of the partial test patterns 122 is scanned using a scanner 134, as shown in FIG. 4. In one example, the partial test patterns 122 can be removed from the wide format print media 120 using a cutting device 132 (such as hand-operated scissors, automated cutting devices, etc.). Additionally, the dashed line 130 represents the region that will be removed from the wide format print media 120. In some embodiments, dashed line 130 can be printed on the sheet to assist the user in the hand cutting operation. Alternatively, dashed line 130 can represent perforations formed into the wide format print media 120 by a cutting/perforation device; and such perforations 130 would allow the user to remove the partial test patterns 122 by hand (without requiring cutting devices).

Alternatively, dashed line 130 can represent fold lines where an automated folding device folds the wide format print media 120 to allow the partial test patterns 122 to be placed upon the scanner 134; or such fold lines 130 can indicate areas where the user manually folds the wide format print media 120 to allow the partial test patterns 122 to physically fit on the scanner 134. In order to accommodate some folding processes, the partial test patterns 122 can be rearranged in a different pattern than that shown in FIGS. 3-4 to allow each partial test pattern 122 to be folded, without affecting other partial test patterns. Additionally, folding and cutting can be used in combination to achieve the same goal where, for example, each partial test pattern 122 is printed in a unique processing direction location (without other partial test patterns 122 being aligned in the cross processing direction) allowing an automated cutter to make cuts in the cross-processing direction and produce individual strips that can be folded to more easily be positioned upon the scanner 134.

While many examples are presented above, those ordinarily skilled in the art would understand that there are other ways to physically position the partial test patterns 122 on the scanner 134 and that the methods and systems herein include all such devices and processes that allow each partial test pattern 122 to be completely scanned in a single scan by the scanner 134.

The amount of overlap 126 is selected to balance the effectiveness of eliminating scanner artifacts at the transition between adjacent overlapped test patterns and processing speed. More specifically, a greater amount of overlap allows the weighting process to be more accurate or more refined; however, such may utilize more processing resources and scan more test patterns. Generally, the overlap can be measured in conventional distance measurements (e.g., millimeters, inches, etc.) or as a percentage (e.g., 1%, 5%, 10%, 25%, etc.) of the width of the partial test pattern.

While the full width test pattern 108 is divided into 3 or 4 partial test patterns 122 in the example shown in FIGS. 3-4, those ordinarily skilled in the art would understand that the full width test pattern 108 could be divided into any number and any size of partial test patterns that would allow each individual partial test pattern 122 to easily fit upon the low-cost, standard-size (e.g., A4, letter, legal, etc. size) scanner 134 that will be utilized to perform the scanning operation (and that such partial test patterns could be repeated). Therefore, the full width test pattern could be divided into any number (e.g., 2, 3, 10, 20, etc.) of any sized partial test patterns.

Figure 5A:
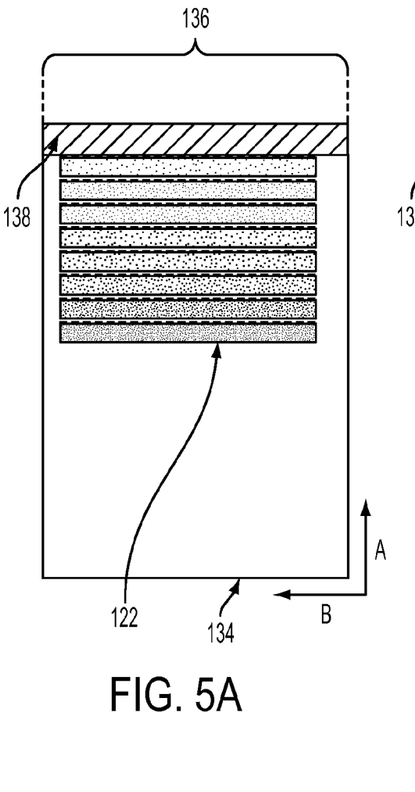
FIGS. 5A and 5B are schematic diagrams illustrating positioning of partial scans placed on a scanner according to methods and systems herein.
Figure 5B:
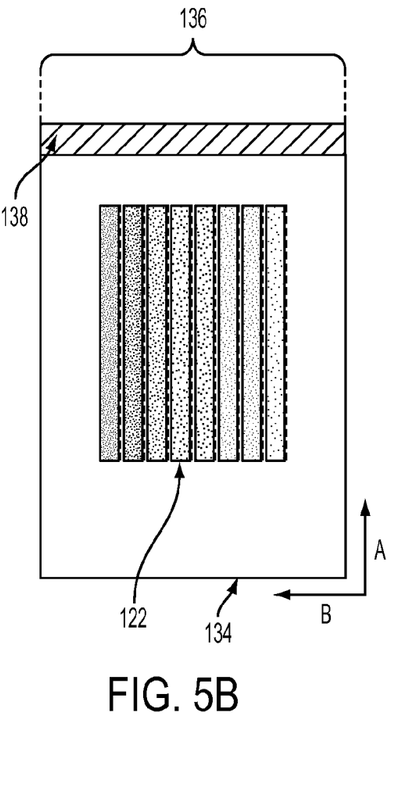

FIGS. 5A and 5B are schematic diagrams illustrating positioning of partial scans 122 placed on a scanner 134 according to methods and systems herein. More specifically, as shown in FIGS. 5A and 5B, the partial test patterns 122 can be placed at different orientations with respect to the width (136) of the scanner. Further, FIGS. 5A and 5B illustrate the scanning width 136 that is controlled by the width of the scan bar 138, and illustrate that the scanning width 136 is wider than the width of the individual partial test patterns 122.

Figure 6:
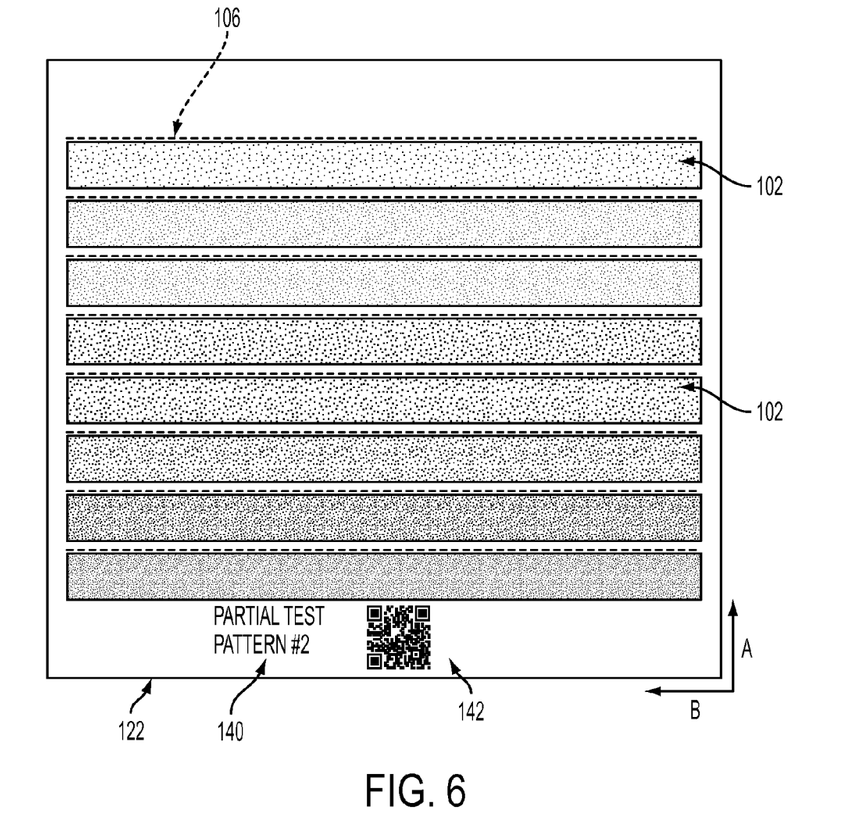
FIG. 6 is a schematic diagram illustrating calibration pattern printing performed by methods and systems herein.

FIG. 6 illustrates one of the partial test patterns 122 in greater detail. Each partial test pattern 122 will include a unique identifier that can be human readable 140 and/or machine-readable 142. Therefore, the partial test patterns 122 can be scanned in the appropriate logically correct order (e.g., scanning the 4 portions of the full width test pattern 108 from left to right as shown in FIG. 3) because the operator performing the scan can follow the order shown in the human readable unique identifier 140; or, if the operator does not scan the partial test patterns 122 in the expected order, the processor can utilize the machine readable unique identifiers 142 to reorder the scans into the appropriate order before combining the scan data.

The cross-process distance markings (fiducials) 106 shown in FIGS. 1 and 5 adjacent the series of strips 102 uniquely identify the cross-process distance to allow mapping from the scanned image space to the digital image space. For example, the full width test pattern 108 shown in FIG. 3 is made up of 4 partial test patterns 122, each of which may cover, for example, 2500 pixels and be overlapped by 500 pixels. The cross-process distance markings 106 allow the cross-process distance from one of the edges (e.g., inboard edge, outboard edge, etc.) of the entire possible printing area to be known with certainty.

Therefore, the cross-process distance markings 106 can simply be rectangular features of light or dark pixels of a known, regular count. For example, the cross-process distance markings 106 can contain 10 white pixels followed by 10 black pixels, in a regular repeating pattern.

Alternatively, the cross-process distance markings 106 can comprise machine-readable markings that specifically identify a pixel distance. Therefore, using the above example of each partial test pattern 122 being 2500 pixels and being overlapped by 500 pixels, the third partial test pattern 122 of the 4 partial test patterns 122 would run from pixel 4001 to pixel 6500, and the cross-process distance markings 106 would indicate such a pixel count if the cross-process distance markings 106 contained machine readable code. One approach to introducing machine readable code is to introduce a known sequence of fiducial widths and fiducial spacings unique to each test pattern. For example, the first four fiducials on the third test pattern could have a width of 8, 12, 9, and 11 pixels with a spacing of 8, 11, and 7 pixels between them. These values would be unique to each partial test pattern 122. A measurement of these spacings when analyzing the test patterns therefore uniquely identifies each different partial test patterns. Otherwise, if the cross-process distance markings 106 were merely prescribed repeating patterns of dark and light pixels, the methods and systems herein correlate the 2500 pixels of the third partial test pattern 122 to run from pixel 4001 to pixel 6500, based on the human readable or machine readable unique identifier (140, 142) indicating that the partial test pattern 122 is the third in a sequence of four.

In one example, a test pattern that would extend the full width of the process can have 15844 pixels at 400 spi or 39.61 inches. The first partial test pattern extends from pixel 1 to pixel 5992. Therefore, the methods and systems herein perform mapping from scanner space to digital image space to map the scanner pixel identified by the left most fiducial to digital pixel 1 and the scanner pixel identified by the right most fiducial to digital pixel 5992. The second partial test pattern extends from pixel 3284 to pixel 9276. All partial test patterns are the same size (in this example, although this is not necessary and the partial test patterns can be different sizes). Therefore, when the partial test patterns are scanned, this produces images with roughly the same pixel count in scanner space. However, with knowledge that the partial test pattern is the second section of the full width test pattern (from the markings 140, 142 for the fiducials 106) results in a mapping of the scanned image to the second portion of digital image pixels. Similar mappings are performed for section 3 and section 4. As noted above, there is an overlap 126 of the test pattern between the partial test patterns and this allows the resulting combined test pattern obtained by combining all the partial test patterns to be robust against noise produced by the scanner.

In the regions 126 of FIG. 3, there are two measurements of the gray level for each strip at each point in the cross process direction. These measurements may be different because of scanner illumination non-uniformities. However, one can choose how to combine these two different measurements in a way to hide errors introduced by the scanner non-uniformity. More specifically, the overlapping test patterns provide a way to make the measurement robust against scanner illumination variation. To eliminate an artificial jump, the profile gray level used for a measurement of the sERC can be formed by making a smooth transition between the two sections, such as by calculating a weighted sum of the measurement from one section and the measurement of the other section, where the weights depend on the distance from the boundaries. In one example, the output gray level given by $$g_{out} = \left(\frac{p - p_L}{p_R - p_L}\right)g_R + \left(\frac{p_R - p}{p_R - p_L}\right)g_L$$

where $p_L$ is the leftmost digital pixel of the test pattern section on the right (3284 in the example above), $p_R$ is the rightmost digital pixel of the test pattern section on the left (5992 in the example), p is the digital pixel for which the measurement is desired (a value between 3284 and 5992), $g_R$ is the gray level measurement of the strip at pixel p for the right test pattern section, $g_L$ is the gray level measurement of the strip at pixel p for the left test pattern section, and $g_{out}$ is used to generate the sERC. The above-calculation is only one example, and those ordinarily skilled in the art would understand that many other similar weighting, smoothing, averaging, etc., processes could be performed to compensate for scanner illumination variation.

Figure 7:
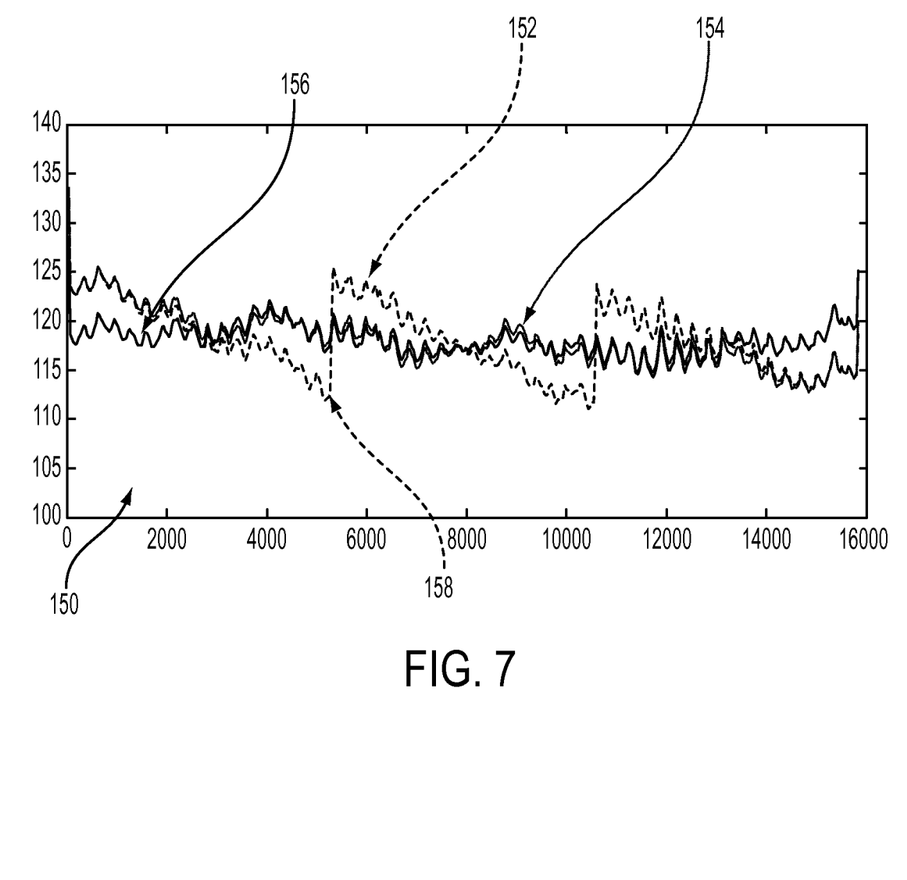
FIG. 7 is a schematic diagram illustrating uniformity measurements produced by methods and systems herein.

FIG. 7 is a schematic diagram graph 150 illustrating raw and processed scan data combined together from 3 partial test patterns. Profile 156 illustrates the true uniformity of the scan. Profile 156 would be the uniformity that would be measured if the measurement of the uniformity was made on a wide format scanner. Profile 152 (that contains a step-like pattern) demonstrates the uniformity measurement if the test pattern was split into sections that did not overlap and were scanned on a flatbed scanner that contained scanner non-uniformities. As can be seen progressing from left to right in the graph 150, the raw scan data 152 decreases in response values until a lower point is reached at which point the response value dramatically increases in a single pixel (or relatively narrow group of pixels). This downward trend followed by a sharp up-spike in profile 152 indicates that the scanner illumination gradually decreases in the cross-processing direction 136, and when the next partial test pattern scan is reached, the beginning scanned pixels in the cross-processing direction 136 (that have the higher illumination values than the ending scanned pixels in the cross-processing direction 136) are once again providing the data, causing the sharp up-spike. If profile 152 was used along with the profiles of the other sampled strips to generate a sERC and from that an sTRC, and the sTRC was used to generate a correction, the correction would not be satisfactory. Contours would be introduced in the images at the transition regions 158.

To the contrary, profile 154 is generated using the overlapped test patterns such as shown in FIG. 3 and the weighting equation given in paragraph 51. Note that, contrary to profile 152, the profile 154 does not contain sharp up-spikes. Profile 154 also better matches profile 156, which represents the actual gray level profile. In this way, the methods and systems herein can combine (or stitch together) many adjacent, sequential, partial test pattern scans to allow a smaller scanner to scan multiple smaller test patterns printed across a much larger print media, and still avoid variations that occur in the full cross-process width 136 of the scanner.

Thus, the methods and systems herein provide a way to measure the spatial Engine Response Curve for wide format printers which is used to compensate for print non-uniformity inherent in the marking engine. The methods and systems herein split the test pattern into sections small enough to be imaged on a flatbed scanner designed to image A3 or A4 sized documents, and overlap the sections of the test pattern so that the sERC measurement is robust against illumination non-uniformities that are present in all scanners.

Figure 8:
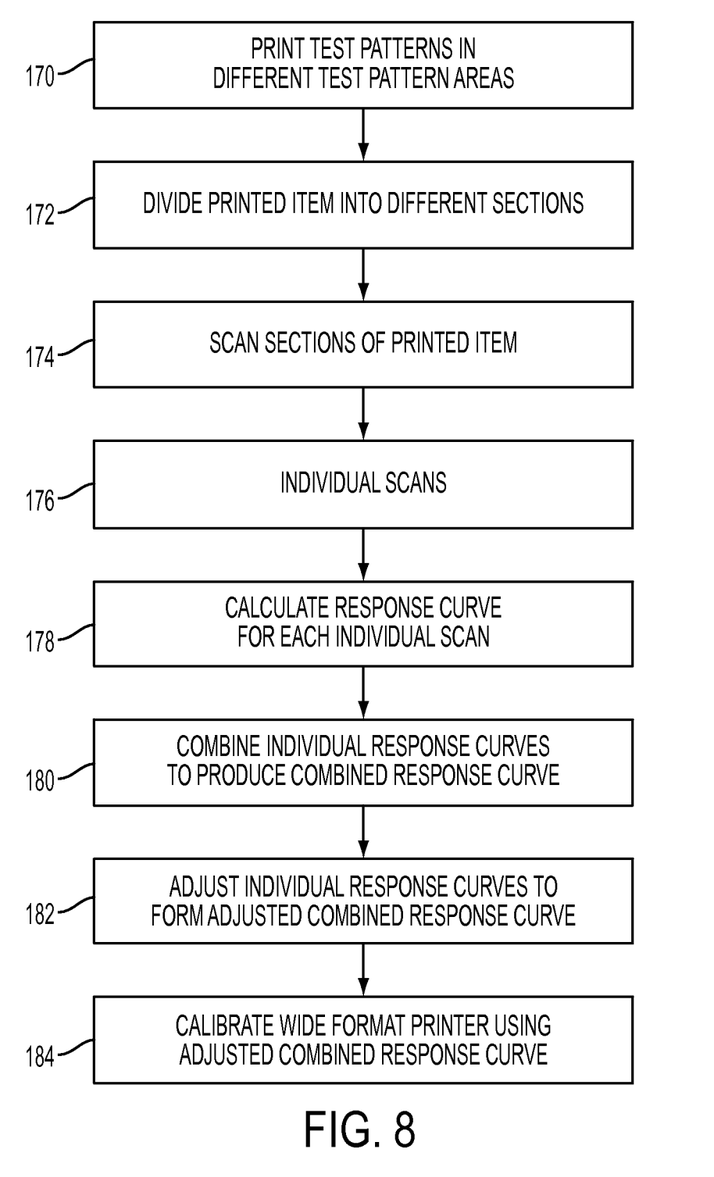
FIG. 8 is a flow diagram of various methods herein.

FIG. 8 is flowchart illustrating exemplary methods herein. In item 170, these methods print test patterns (item 102, FIG. 3) in different test pattern areas (item 122, FIG. 3) on print media using a printer to produce a printed item (item 120, FIG. 3). The printing in item 170 moves the print media in a process direction (A). The printer has a printing width in a cross-process direction (B) perpendicular to the process direction, and each of the test pattern areas is in a different cross-process location of the printing width. The test pattern areas are distributed across all the printing width (104, FIG. 3), and each of the test pattern areas partially overlaps (126, FIG. 3) at least one other test pattern area in the cross-process direction. However, overlapping test pattern areas are in different process direction locations on the print media to avoid being overprinted on one another.

In item 172, such methods divide the printed item into different sections (130, FIG. 4) where each of the sections contains at least one of the test pattern areas. Next, in item 174, these methods individually scan the sections of the printed item using a scanner (134, FIG. 4) that has a scanning width that is less than the printing width. More specifically, the maximum scanning width of the scanner in the cross-processing direction can be substantially less than the maximum printing width of the printer in the cross-processing direction (e.g., the scanner can have a width that is 50%, 33%, 25%, 10%, etc., of the width of the printer). This produces multiple (e.g., 2, 3, 4, 5, 8, 10, 15, etc) individual scans, one individual scan for each of the test pattern areas that is scanned, shown as item 176.

The widths of the test pattern areas are equal to or less than the scanning width of the scanner. One efficient operation of methods and systems herein sizes the test pattern areas to match the maximum scanning width of the scanner (and this minimizes the number of test pattern areas that need to be scanned). However, other situations may benefit from scans that are dramatically smaller than the scanner and are easier to handle, or that allow multiple test pattern areas to be scanned simultaneously on the scanner.

Next, in item 178, these methods calculate an individual response curve for each of the individual scans. These individual response curves are combined in item 180 to produce a combined response curve.

Each of the individual response curves can be adjusted using a process such as weighting, smoothing, averaging, etc., in item 182. The process of adjusting each individual response curve that make up the combined response curve in item 182 generates an adjusted combined response curve. Then, the methods herein can, in item 184, calibrate the wide format printer using the adjusted combined response curve produced by item 182. Stated differently, these methods calculate overlap curves by applying a function to overlapping sections of the individual response curves, and adjust the individual response curves within the combined response curve using the overlap curves (using the processor) to produce an adjusted combined response curve.

The test patterns include alignment marks for correlating overlapping sections of overlapping test pattern areas, and each of the test patterns comprises a different identifier to allow the scans to be processed in the correct order and location. The process of adjusting the individual response curves weights the individual response curves to compensate for non-uniform illumination of the scanner and produce a more accurate adjusted combined response curve.

Figure 9:
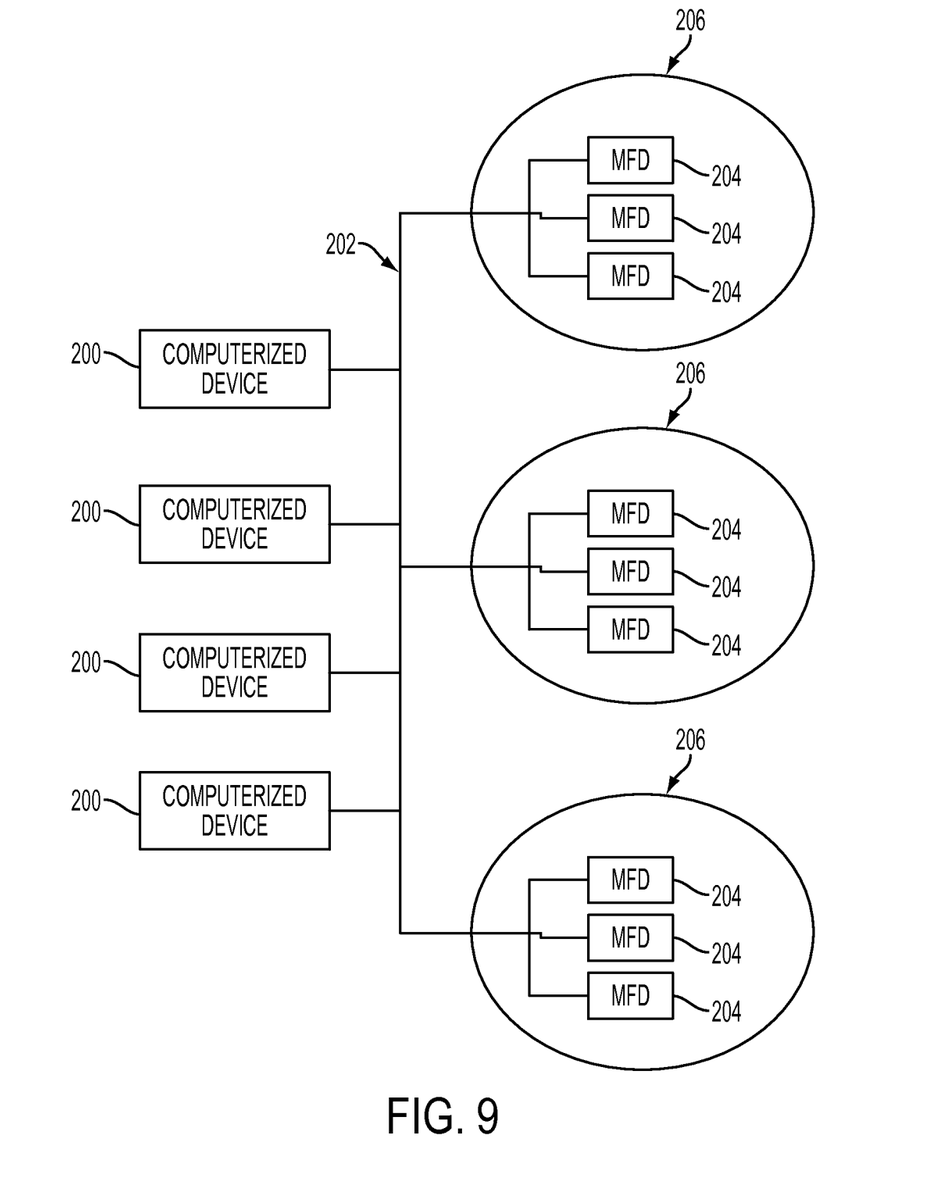
FIG. 9 is a schematic diagram illustrating systems herein.

As shown in FIG. 9, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 10:
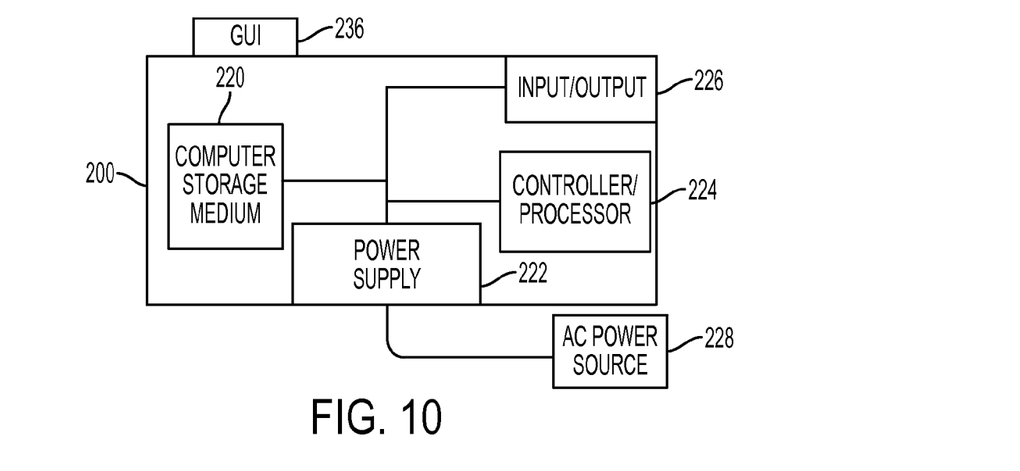
FIG. 10 is a schematic diagram illustrating devices herein.

FIG. 10 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236, that also operates on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 10, a body housing has one or more functional components that operate on power supplied from an alternating current (AC) source 228 by the power supply 222. The power supply 222 can comprise a power storage element (e.g., a battery, etc).

Figure 11:
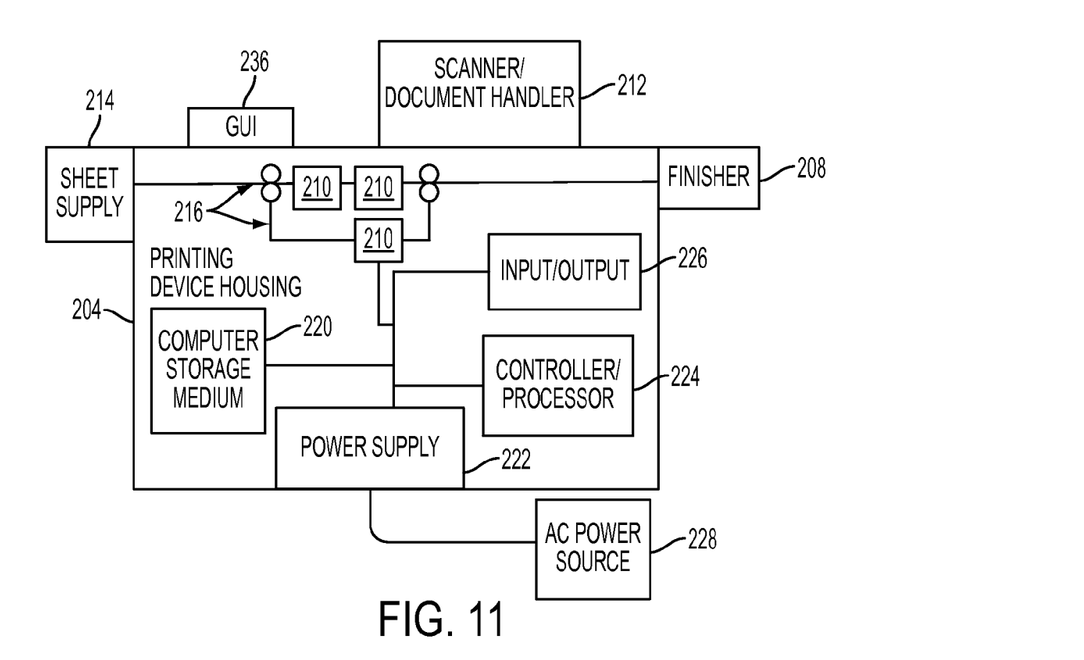
FIG. 11 is a schematic diagram illustrating devices herein.

FIG. 11 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, systems herein include a printer 204 printing test patterns in different test pattern areas on print media to produce a printed item. The printer 204 moves the print media in a process direction when printing. The printer 204 has a printing width in a cross-process direction perpendicular to the process direction, and each of the test pattern areas is centered in a different cross-process location of the printing width. The test pattern areas are distributed across the entire printing width, and each of the test pattern areas partially overlaps another test pattern area in the cross-process direction. Also, a scanner 134 individually scans different sections of the printed item after the printed item is divided into the sections to produce individual scans of the test pattern areas, and each of the sections contains at least one of the test pattern areas. The scanner 134 has a scanning width that is less than the printing width, and the widths of the test pattern areas are equal to or less than the scanning dimensions.

A processor is operatively (meaning directly or indirectly) connected to the printer 204 and the scanner 134, and the processor 224 calculates individual response curves for the individual scans, combines the individual response curves into a combined response curve, and calculates the differences between the overlapping portions of the individual response curves within the combined response curve to identify the amount of non-uniformity within the scanner 134. This allows the processor 224 to adjust the individual response curves within the combined response curve based on the amount of non-uniformity within the scanner 134 to produce an adjusted combined response curve. Thus, the processor 224 can calibrate the cross-process characteristics of the printer 204 using the adjusted combined response curve.

As would be understood by those ordinarily skilled in the art, the printing device 102 shown in FIG. 11 is only one example and the systems and methods herein are equally applicable to other types of printing devices that may include fewer components or more components. For example, while a limited number of printing engines and paper paths are illustrated in FIG. 11, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   printing test patterns in different test pattern areas on print media using a printer to produce a printed item, said printer having a printing width, each of said test pattern areas being in a different location of said printing width, and each of said test pattern areas partially overlapping another of said test pattern areas;
   individually scanning said test pattern areas of said printed item using a scanner having a scanning width that is less than said printing width to produce individual scans of said test pattern areas, widths of said test pattern areas being equal to or less than said scanning width;
   calculating individual response curves for said individual scans using a processor operatively connected to said printer;
   adjusting said individual response curves based on differences between overlapping portions of said individual response curves, using said processor, to produce an adjusted combined response curve; and
   calibrating cross-process characteristics of said printer based on said adjusted combined response curve, using said processor.

2. The method according to claim 1, said adjusting comprising weighting, in said overlapping portions of said individual response curves, based on an average of said individual response curves.

3. The method according to claim 2, said average comprising a linear transition between adjacent ones of said individual response curves in a cross-process direction.

4. The method according to claim 1, said test patterns comprising alignment marks for mapping said individual scans to said adjusted combined response curve.

5. The method according to claim 4, further comprising correlating adjacent ones of said individual response curves using said alignment marks.

6. A method comprising:
   printing test patterns in different test pattern areas on print media using a printer to produce a printed item, said printing moving said print media in a process direction, said printer having a printing width in a cross-process direction perpendicular to said process direction, each of said test pattern areas being in a different cross-process location of said printing width, said test pattern areas being distributed across all said printing width, and each of said test pattern areas partially overlapping another of said test pattern areas in said cross-process direction;

dividing said printed item into different sections, each of said sections containing one of said test pattern areas;

individually scanning said sections of said printed item using a scanner having a scanning width that is less than said printing width to produce individual scans of said test pattern areas, widths of said test pattern areas being equal to or less than said scanning width;

calculating individual response curves for said individual scans using a processor operatively connected to said printer;

combining said individual response curves into a combined response curve, using said processor;

calculating overlap curves by applying a function to overlapping portions of said individual response curves using said processor;

adjusting said individual response curves within said combined response curve using said overlap curves using said processor to produce an adjusted combined response curve; and calibrating cross-process characteristics of said printer based on said adjusted combined response curve, using said processor.

7. The method according to claim 6, said adjusting comprising weighting, in said overlapping portions of said individual response curves, based on an average of said individual response curves.

8. The method according to claim 7, said average comprising a linear transition between adjacent ones of said individual response curves in a cross-process direction.

9. The method according to claim 6, said test patterns comprising alignment marks for mapping said individual scans to said adjusted combined response curve.

10. The method according to claim 9, further comprising correlating adjacent ones of said individual response curves using said alignment marks.

11. A printing system comprising:

a printer printing test patterns in different test pattern areas on print media to produce a printed item, said printer having a printing width, each of said test pattern areas being in a different location of said printing width, and each of said test pattern areas partially overlapping another of said test pattern areas relative to said printing width;

a scanner individually scanning different sections of said printed item to produce individual scans of said test pattern areas; and a processor operatively connected to said printer and said scanner, said processor calculating individual response curves for said individual scans, said processor adjusting said individual response curves based on differences between overlapping portions of said individual response curves to produce an adjusted combined response curve, and said processor calibrating cross-process characteristics of said printer based on said adjusted combined response curve.

12. The printing system according to claim 11, said processor adjusting said combined response curve by weighting said overlapping portions of said individual response curves, based on an average of said individual response curves.

13. The printing system according to claim 12, said average comprising a linear transition between adjacent ones of said individual response curves in a cross-process direction.

14. The printing system according to claim 11, said test patterns comprising alignment marks for mapping said individual scans to said adjusted combined response curve.

15. The printing system according to claim 14, said processor correlating adjacent ones of said individual response curves using said alignment marks.

16. A printing system comprising:

a printer printing test patterns in different test pattern areas on print media to produce a printed item, said printing moving said print media in a process direction, said printer having a printing width in a cross-process direction perpendicular to said process direction, each of said test pattern areas being in a different cross-process location of said printing width, said test pattern areas being distributed across all said printing width, and each of said test pattern areas partially overlapping another of said test pattern areas relative to said printing width;

a scanner individually scanning different sections of said printed item after said printed item is divided into said sections to produce individual scans of said test pattern areas, each of said sections containing one of said test pattern areas, said scanner having a scanning width that is less than said printing width, widths of said test pattern areas being equal to or less than said scanning width; and a processor operatively connected to said printer and said scanner, said processor calculating individual response curves for said individual scans, said processor combining said individual response curves into a combined response curve, said processor calculating overlap curves by applying a function to overlapping sections of said individual response curves;

said processor adjusting said individual response curves within said combined response curve using said overlap curves to produce an adjusted combined response curve; and said processor calibrating cross-process characteristics of said printer based on said adjusted combined response curve.

17. The printing system according to claim 16, said processor adjusting said combined response curve by weighting said overlapping portions of said individual response curves, based on an average of said individual response curves.

18. The printing system according to claim 17, said average comprising a linear transition between adjacent ones of said individual response curves in a cross-process direction.

19. The printing system according to claim 16, said test patterns comprising alignment marks for mapping said individual scans to said adjusted combined response curve.

20. The printing system according to claim 19, said processor correlating adjacent ones of said individual response curves using said alignment marks.

* * * * *